United States Patent
Saint-Michel et al.

(10) Patent No.: US 6,833,647 B2
(45) Date of Patent: Dec. 21, 2004

(54) DISCOID MACHINE

(75) Inventors: Jacques Saint-Michel, Angouleme (FR); Atef Abou-Akar, L'Isle d'Espagnac (FR)

(73) Assignee: Moteurs Leroy-Somer, Angouleme (FR)

(*) Notice: Subject to any disclaimer, the term of this patent is extended or adjusted under 35 U.S.C. 154(b) by 203 days.

(21) Appl. No.: 10/193,180

(22) Filed: Jul. 12, 2002

(65) Prior Publication Data

US 2003/0011274 A1 Jan. 16, 2003

(30) Foreign Application Priority Data

Jul. 13, 2001 (FR) ............................................. 01 09424

(51) Int. Cl.⁷ ............................................. H02K 19/26
(52) U.S. Cl. ........................... 310/156.31; 310/156.31; 310/56.37
(58) Field of Search ............................ 310/156, 31, 56, 310/37

(56) References Cited

U.S. PATENT DOCUMENTS

| 2,230,878 | A | * | 1/1941 | Bohli |
| 5,245,238 | A | | 9/1993 | Lynch et al. |
| 5,619,087 | A | * | 4/1997 | Sakai ........................ 310/268 |
| 5,982,069 | A | * | 11/1999 | Rao ........................... 310/208 |

FOREIGN PATENT DOCUMENTS

| DE | 14 88 011 A | 4/1969 |
| DE | 93 16 370 U1 | 3/1994 |
| JP | A 57-160357 | 10/1982 |
| JP | A 59-159656 | 9/1984 |
| JP | A 61-244250 | 10/1986 |

* cited by examiner

Primary Examiner—Nicholas Ponomarenko
Assistant Examiner—Iraj A. Mohandesi
(74) Attorney, Agent, or Firm—Oliff & Berridge, PLC

(57) ABSTRACT

The present invention relates to a discoid machine having a rotor and a stator placed facing each other along the axis of rotation of the rotor. The machine is synchronous and has at least two rotors disposed on either side of a stator.

51 Claims, 3 Drawing Sheets

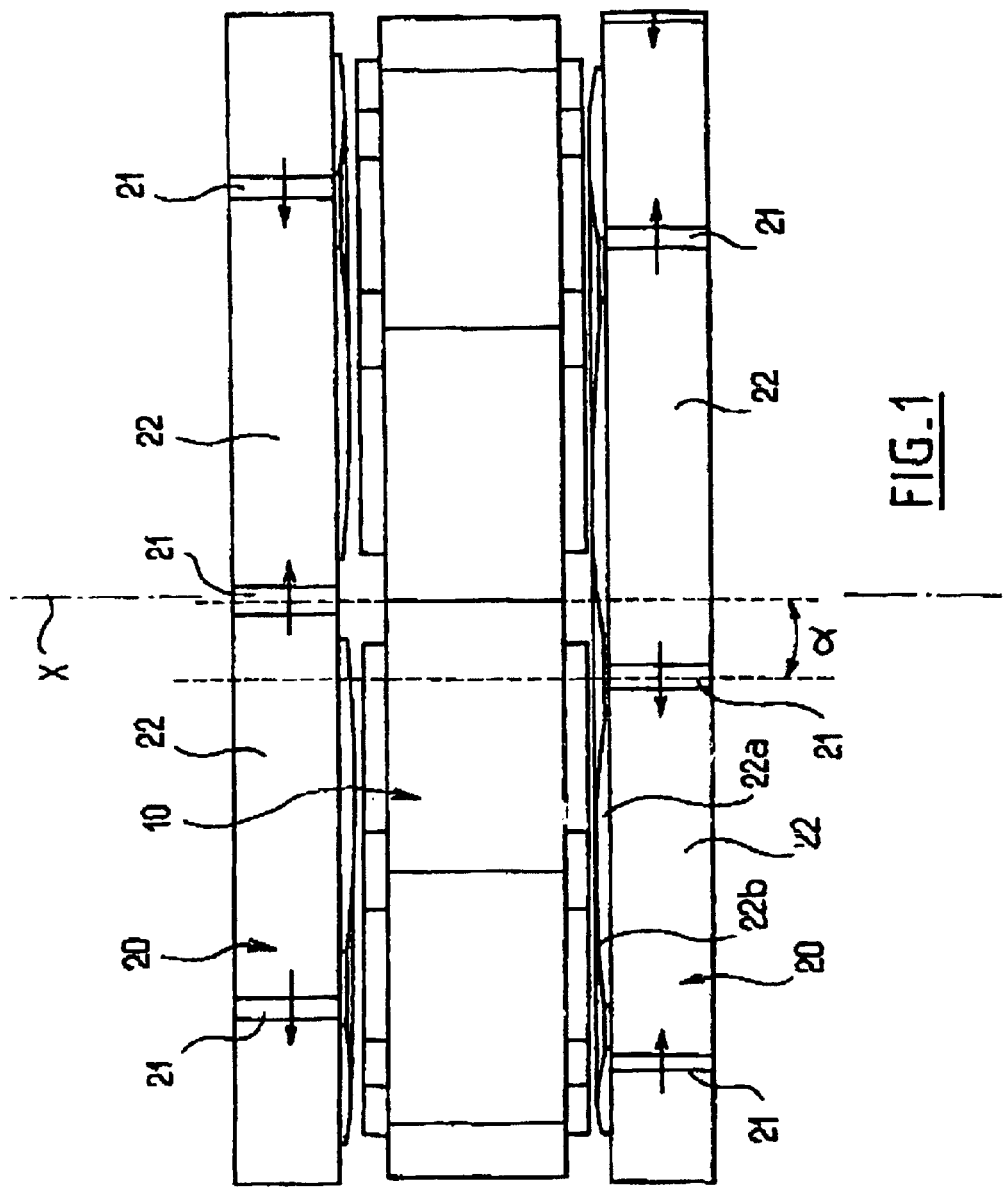

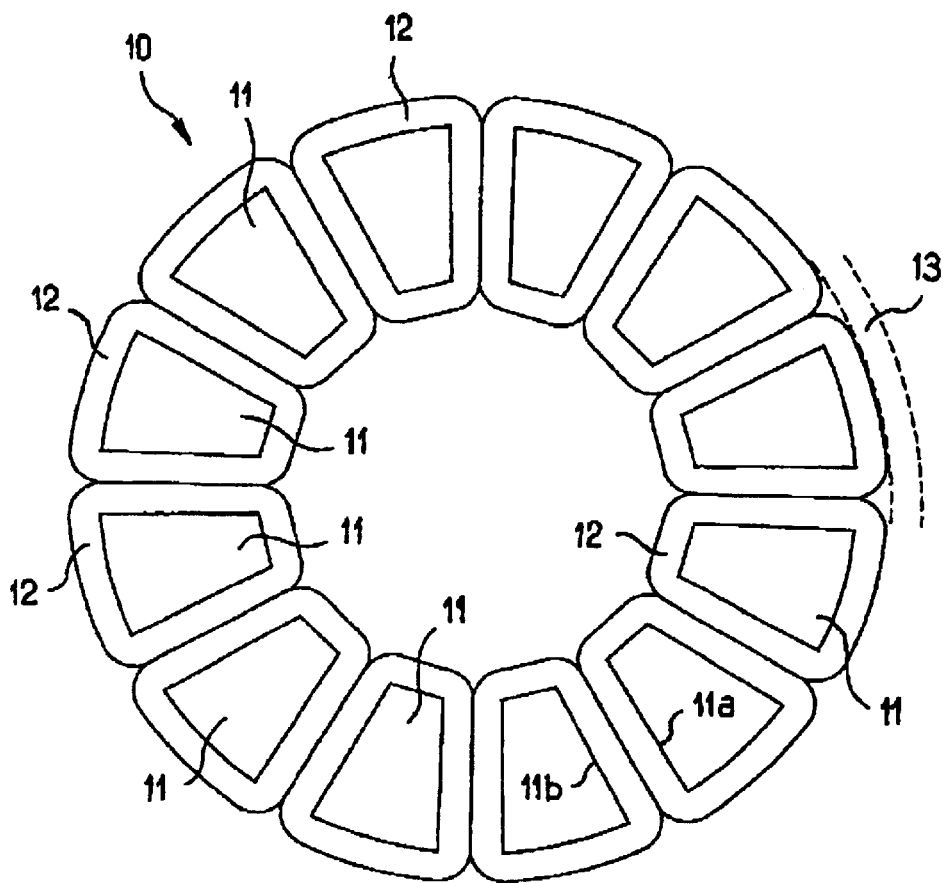
FIG_2
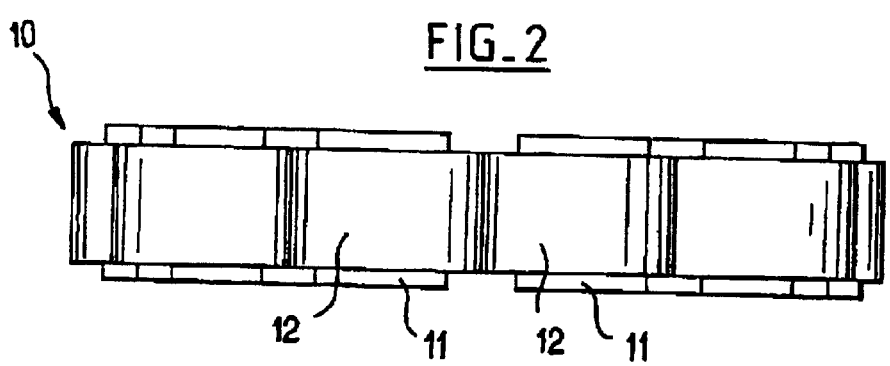
FIG_3

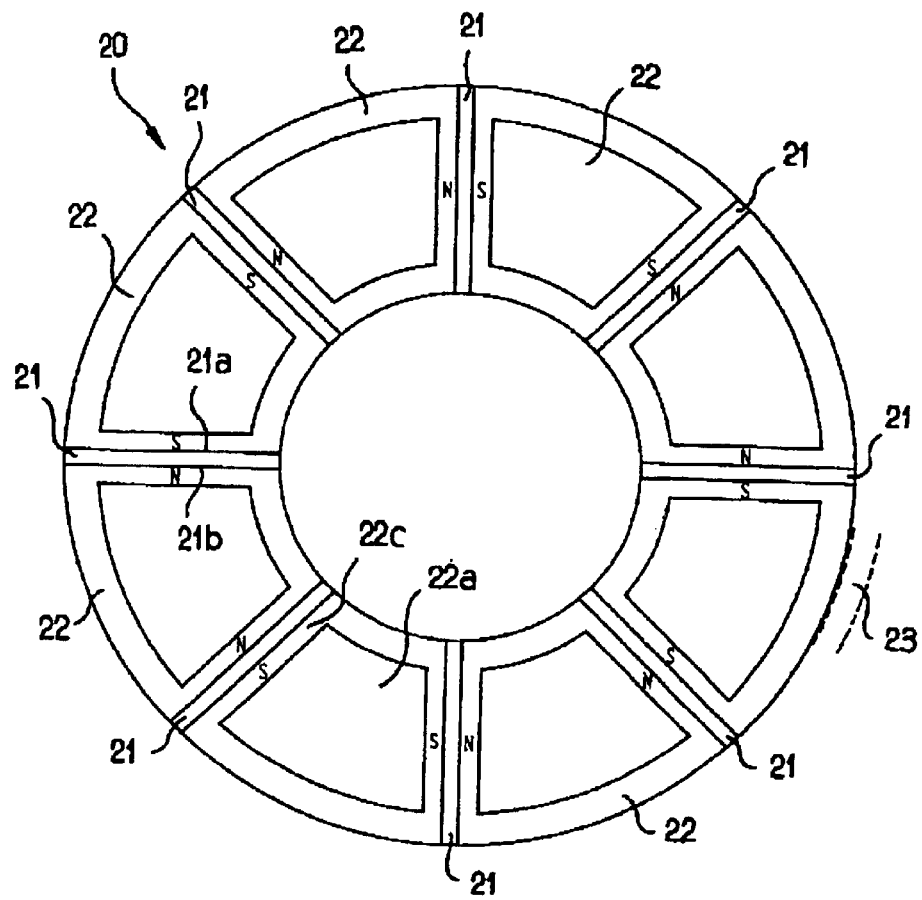
FIG_4
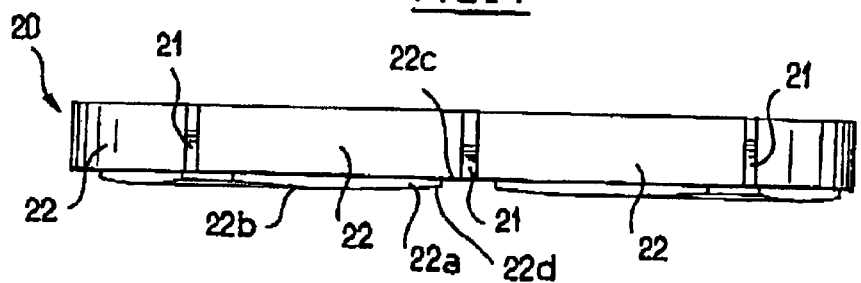
FIG_5

US 6,833,647 B2

DISCOID MACHINE

The present invention relates to electrical machines, and more particularly to brushless so-called "discoid" machines comprising a rotor and a stator placed facing each other on the axis of rotation of the rotor.

The invention relates to a synchronous machine comprising at least two rotors placed on either side of a stator. The use of two rotors makes it possible to double the torque for substantially the same quantity of iron and copper in the stator, thus making it possible to improve efficiency quite considerably. The rotors comprise permanent magnets disposed between pole pieces suitable for concentrating their magnetic flux.

BACKGROUND OF THE INVENTION

U.S. Pat. No. 5,245,238 describes a known machine of that type, Its windings are distributed.

OBJECTS AND SUMMARY OF THE INVENTION

In the machine of the invention, the stator has a magnetic circuit with teeth, each serving as a core for a coil. This makes the stator easier to manufacture and the overall size of the machine can be reduced because there is no winding overhang of the kind to be found in conventional machines having distributed windings.

In a preferred embodiment, at least two of said rotors are angularly offset relative to each other. Such an offset makes it possible to reduce or even eliminate ripple in the torque.

In particular, when the number m of phases is even, at least two of said rotors can be offset by an angle α close to π/S, where S=m.p gives the number of teeth of the stator, p being the number of pairs of poles. When m is odd, then at least two of said rotors can be offset by an angle α close to π/2S.

The number of stator teeth S can also satisfy one of the following relationships:

S=2m.n where p=m.n±1, n being an arbitrary integer; or

S=m(2n+1), where 2p=m(2n+1)±1, and n is an arbitrary integer.

In particular when S satisfies one of these two relationships, the two rotors need not be angularly offset.

In a particular embodiment, the stator does not have a magnetic yoke, thus making it possible further to reduce losses to a significant extent, particularly at high speeds. The absence of a stator yoke eliminates those losses which would have taken place in the stator due to the magnetic induction varying in time. The coils and the teeth of the stator can then be housed in a non-magnetic casing. The same applies to the magnets and the pole pieces of the rotors. The stator may have teeth presenting facing faces that are plane and parallel, at least over a major fraction of the length of each tooth.

The stator teeth may be supported by two non-magnetic pieces connecting them to the casing.

Each rotor pole piece may have a rounded surface facing the stator, in particular a surface that is generally convex towards the stator, so as to reduce harmonics in the electromotive force.

In a particular embodiment, the magnetic circuit of the stator is made from a substance based on a powdered magnetic material. The pole pieces of the rotors may also be made from a substance of the same type, where appropriate, thereby facilitating the provision of rounded surfaces directed towards the stator.

The invention applies equally well to providing a motor or a generator.

The invention also provides the use of a machine as defined above as a motor or as a generator and rotating at a speed in excess of 4000 revolutions per minute (rpm), for example.

BRIEF DESCRIPTION OF THE DRAWINGS

Other characteristics and advantages of the present invention appear on reading the following detailed description of a non-limiting embodiment, and on examining the accompanying drawings, in which:

FIG. 1 is a fragmentary diagrammatic side view of a discoid machine made in accordance with the invention;

FIG. 2 is a diagram showing a portion of the stator on its own, as seen from above;

FIG. 3 is a side view of the FIG. 2 stator;

FIG. 4 is a diagram showing a portion of one of the rotors on its own and as seen from above; and FIG. 5 is a side view of the FIG. 4 rotor.

MORE DETAILED DESCRIPTION

FIG. 1 is a diagram of a synchronous motor comprising a stator 10 and two rotors 20 rotating about an axis X on either side of the stator 10.

In the embodiment described, both rotors 20 are identical, and they are angularly offset from each other in a manner specified in greater detail below. Ignoring this angular offset, the two rotors are disposed symmetrically to each other about the midplane of the stator 10 extending perpendicularly to the axis X.

FIGS. 2 and 3 show the stator 10 on its own. The stator comprises a plurality of teeth 11, there being twelve teeth in the example described, with the motor being powered by three-phase electricity and having eight poles. Each tooth 11 serves as a core for an individual coil 12.

On examining FIG. 2, it can be seen that the teeth 11 are of generally trapezoidal cross-section in a section plane perpendicular to the axis X, the larger base being situated radially outwards. The teeth 11 are of substantially constant cross-section, at least over a major fraction of their length. Two adjacent teeth 11 present facing faces 11a and 11b that are plane and parallel, at least over a major fraction of their length.

Each coil 12 can be wound directly on a tooth 11 or it can be wound separately and then put into place on the corresponding tooth 11, in which case the teeth 11 should not have any enlargements forming pole pieces. The teeth 11 fitted with their respective coils 12 can be placed in a circle around the axis X and then inserted inside a non-magnetic casing 13 which is represented by dashed lines in FIG. 2, only part of it being shown in order to clarify the drawing. This casing can serve in particular as a duct for a cooling fluid.

The axial size of the teeth 11 is greater than the axial size of the coils 12, as can be seen in FIG. 3, such that the teeth 11 present portions projecting from the coils 12, each such portion being directed towards a corresponding rotor 20. The projecting portions receive two non-magnetic pieces (not shown in order to clarify the drawing) serving to support the stator and to connect it to the casing 13.

FIGS. 4 and 5 show a rotor 20. The rotor comprises a plurality of permanent magnets 21, there being eight permanent magnets in the example shown, since the motor is an eight-pole motor. These magnets 21 are disposed between pole pieces 22.

In the example shown, each magnet 21 presents two pole faces 21a and 21b that are plane and parallel, but it would not go beyond the ambit of the present invention for the pole faces 21a and 21b to be non-parallel, converging towards the outside of the rotor, so as to obtain a magnet wedging effect under the effect of centrifugal force.

The magnets 21 have pole pieces oriented in such a manner that the pole pieces 22 concentrate magnetic flux, i.e. two adjacent magnets 21 have same-polarity faces facing the pole piece 22 that is disposed between them.

The pole pieces 22 and the magnets 21 can be held by a casing 23 made of non-magnetic material, which casing is represented by dashed lines in FIG. 4, and is shown in part only in order to clarify the drawing.

Each pole piece 22 has a projecting central portion 22a on its face that faces towards the stator 10. This projecting portion 22a presents a rounded surface 22b that bulges slightly towards the stator 10, and that is connected to a peripheral zone 22c of the pole piece 21 via a step 22d. The bulging shape of the surface 22b serves to reduce harmonics in the electromotive force.

The magnetic field leaves the projecting portion 22a of the pole piece 22 to cross the air gap between the rotor 20 and the stator 10 and reach the teeth 11 of the stator 10.

It should be observed that the thickness of a pole piece 22 where it joins the adjacent magnets 21 is substantially the same as the thickness of the magnets.

The teeth 11 of the stator 10, like the pole pieces 22 of the rotors 20 can be laminated, i.e. built up from a stack of varnish-covered magnetic laminations so as to reduce induced current losses, or they can be made by molding a substance based on a powdered magnetic material.

Arrows in FIG. 1 show the orientations of the magnetic fields of the magnets 21 in the two rotors 20. It can be seen in FIG. 1 that the two rotors 20 are angularly offset from each other about the axis X through an angle α which is selected so as to reduce or even eliminate ripple in torque. If m it the number of phases, e.g. being equal to three in the example described, and p is the number of pairs of poles, then the number of stator teeth is S=m.p and the number of pole pieces for each rotor is R=2.p.

For even m, the fundamental frequency f of ripple in the torque as expressed in Hz is equal to S.N/60 where N is the speed of rotation of the motor in rpm. To eliminate this ripple, it suffices to offset the rotors through an angle α=π/S. For odd m, the fundamental frequency f of ripple in the torque as expressed in Hz is equal to 2.S.N/60. To eliminate this ripple it suffices to offset the two rotors by an angle α=π/2S.

Naturally, the invention is not limited to making a motor and it applies equally to making a generator.

In the invention, the magnetic flux can be looped via two rotor yokes instead of a stator yoke and a rotor yoke, thereby enabling torque to be increased, and losses to be reduced, particularly at high speeds, e.g. speeds greater than 4000 rpm.

The invention is not limited to a single stator and the machine could have a plurality of stators, and more than two rotors.

What is claimed is:

1. A synchronous discoid machine, comprising:
    a stator having a magnetic circuit comprising teeth each serving as a core for a coil; and
    at least two rotors placed on either side of said stator on an axis of rotation of the rotors, said rotors comprising:
        pole pieces; and
        permanent magnets placed between said pole pieces, said pole pieces concentrating a magnetic flux of said magnets.

2. A machine according to claim 1, wherein said stator has teeth presenting facing faces that are plane and parallel, at least over a major fraction of the length of said teeth.

3. A machine according to claim 1, wherein said stator has teeth that do not have any pole piece enlargements.

4. A machine according to claim 1, wherein at least two rotors are angularly offset relative to each other.

5. A machine according to claim 1, wherein said stator does not have a magnetic yoke.

6. A machine according to claim 1, wherein each pole piece presents a rounded surface facing the stator.

7. A machine according to claim 6, wherein said surface is generally convex in shape.

8. A machine according to claim 1, wherein said magnetic circuit of said stator is made from a substance based on a powdered magnetic material.

9. A machine according to claim 1, wherein said pole pieces of said rotors are made from a substance based on powdered magnetic material.

10. A machine according to claim 1, wherein the coils and the teeth of said stator are housed in a non-magnetic casing.

11. A machine according to claim 10, wherein said teeth are supported by two non-magnetic pieces connecting them to the casing.

12. A machine according to claim 10, wherein the casing serves as a duct for a cooling fluid.

13. A machine according to claim 1, wherein the magnets and the pole pieces are housed in a non-magnetic casing.

14. A machine according to claim 1, wherein said stator has teeth of substantially trapezoidal cross-section, with faces converging radially inwards.

15. A motor or generator comprising the machine as defined in claim 1 and rotating at a speed greater than 4000 rpm.

16. A machine according to claim 1, wherein the permanent magnets are magnetized in the circumferential direction.

17. A synchronous discoid machine, comprising:
    a stator; and
    at least two rotors placed on either side of said stator on an axis of rotation of the rotors, said rotors comprising:
        pole pieces; and
        permanent magnets placed between said pole pieces, said pole pieces concentrating a magnetic flux of said magnets, wherein each pole piece presents a rounded surface facing the stator.

18. A machine according to claim 17, wherein said stator has a magnetic circuit comprising teeth each serving as a core for a coil.

19. A machine according to claim 17, wherein said stator has teeth presenting facing faces that are plane and parallel, at least over a major fraction of the length of said teeth.

20. A machine according to claim 17, wherein said stator has teeth that do not have any pole piece enlargements.

21. A machine according to claim 17, wherein at least two rotors are angularly offset relative to each other.

22. A machine according to claim 17, wherein said stator does not have a magnetic yoke.

23. A machine according to claim 17, wherein said surface is generally convex in shape.

24. A machine according to claim 17, wherein said magnetic circuit of said stator is made from a substance based on a powdered magnetic material.

25. A machine according to claim 17, wherein said pole pieces of said rotors are made from a substance based on powdered magnetic material.

26. A machine according to claim 17, wherein the coils and the teeth of said stator are housed in a non-magnetic casing.

27. A machine according to claim 26, wherein said teeth are supported by two non-magnetic pieces connecting them to the casing.

28. A machine according to claim 26, wherein the casing serves as a duct for a cooling fluid.

29. A machine according to claim 17, wherein the magnets and the pole pieces are housed in a non-magnetic casing.

30. A machine according to claim 17, wherein said stator has teeth of substantially trapezoidal cross-section, with faces converging radially inwards.

31. A machine according to claim 17, wherein the permanent magnets are magnetized in the circumferential direction.

32. A synchronous discoid machine, comprising:
   a stator; and
   at least two rotors angularly offset relative to each oilier and placed on either side of said stator on an axis of rotation of the rotors, said rotors comprising:
      pole pieces; and
      permanent magnets placed between said pole pieces, said pole pieces concentrating a magnetic flux of said magnets.

33. A machine according to claim 32, wherein said stator has a magnetic circuit comprising teeth each serving as a core for a coil.

34. A machine according to claim 32, wherein said stator has teeth presenting facing faces that are plane and parallel, at least over a major fraction of the length of said teeth.

35. A machine according to claim 32, wherein said stator has teeth that do not have any pole piece enlargements.

36. A machine according to claim 32, wherein said stator does not have a magnetic yoke.

37. A machine according to claim 32, wherein each pole piece presents a rounded surface facing the stator and wherein said surface is generally convex in shape.

38. A machine according to claim 32, wherein said magnetic circuit of said stator is made from a substance based on a powdered magnetic material.

39. A machine according to claim 32, wherein said pole pieces of said rotors are made from a substance based on powdered magnetic material.

40. A machine according to claim 32, wherein the coils and the teeth of said stator are housed in a non-magnetic casing.

41. A machine according to claim 40, wherein said teeth are supported by two non-magnetic pieces connecting them to the casing.

42. A machine according to claim 40, wherein the casing serves as a duct for a cooling fluid.

43. A machine according to claim 32, wherein the magnets and the pole pieces are housed in a non-magnetic casing.

44. A machine according to claim 32, wherein said stator has teeth of substantially trapezoidal cross-section, with faces converging radially inwards.

45. A machine according to claim 32, wherein the permanent magnets are magnetized in the circumferential direction.

46. A synchronous discoid machine, comprising:
   a stator; and
   at least two rotors placed on either side of said stator on an axis of rotation of the rotors, said rotors comprising:
      pole pieces; and
      permanent magnets placed between said pole pieces, said pole pieces concentrating a magnetic flux of said magnets;
   wherein said stator has a magnetic circuit comprising teeth each serving as a core for a coil, and
   wherein, when the number of phases m is even, at least two of said rotors are offset by an angle a close to $\pi/S$ where $S=m \cdot p$ is the number of stator teeth, p being the number of pairs of poles, and when m is odd, at least two of said rotors are offset by an angle $\alpha$ close to $\pi/2S$.

47. A synchronous discoid machine, comprising:
   a stator; and
   at least two rotors placed on either side of said stator on an axis of rotation of the rotors, said rotors comprising:
      pole pieces; and
      permanent magnets placed between said pole pieces, said pole pieces concentrating a magnetic flux of said magnets;
   wherein said stator has a magnetic circuit comprising teeth each serving as a core for a coil, and
   wherein $S=2m \cdot n$ where $p=m \cdot n \pm 1$ where n is an arbitrary integer, m is the number of phases, p is the number of pairs of poles, and S is the number of stat teeth.

48. A synchronous discoid machine, comprising:
   a stator; and
   at least two rotors placed on either side of said stator on an axis of rotation of the rotors, said rotors comprising:
      pole pieces; and
      permanent magnets placed between said pole pieces, said pole pieces concentrating a magnetic flux of said magnets;
   wherein said stator has a magnetic circuit comprising teeth each serving as a core for a coil, and
   wherein $S=m(2n+1)$, with $2p=m(2n+1)\pm1$, where n is an arbitrary integer, m is the number of phases, p is the number of pairs of poles, and S is the number of stator teeth.

49. A machine according to claim 1, wherein, when the number of phases m is even, at least two of said rotors are offset by an angle $\alpha$ close to $\pi/S$ where $S=m \cdot p$ is the number of stator teeth, p being the number of pairs of poles, and when m is odd, at least two of said rotors are offset by an angle $\alpha$ close to $\pi/2S$.

50. A machine according to claim 1, wherein $S=2m \cdot n$ where $p=m \cdot n \pm 1$ where n is an arbitrary integer, m is the number of phases, p is the number of pairs of poles, and S is the number of stator teeth.

51. A machine according to claim 1, wherein $S=m(2n+1)$, with $2p=m(2n+1)\pm1$, where n is an arbitrary integer, m is the number of phases, p is the number of pairs of poles, and S is the number of stator teeth.

* * * * *

UNITED STATES PATENT AND TRADEMARK OFFICE
CERTIFICATE OF CORRECTION

PATENT NO. : 6,833,647 B2
DATED : December 21, 2004
INVENTOR(S) : Jacques Saint-Michel et al.

It is certified that error appears in the above-identified patent and that said Letters Patent is hereby corrected as shown below:

Title page,
Item [56], References Cited, add the following:
-- OTHER REFERENCES
CHO, C. Peter et al., "Detent Torque and Axial Force Effects in a Dual Air-Gap Axial-Field Brushless Motor," IEEE Transactions on Magnetics 29 (1993) November, No. 6, New York, US, pp. 2416-2418 --

Signed and Sealed this

Seventeenth Day of May, 2005

JON W. DUDAS
*Director of the United States Patent and Trademark Office*